(12) United States Patent
Van Keulen et al.

(10) Patent No.: US 6,403,049 B1
(45) Date of Patent: Jun. 11, 2002

(54) HYDROGEN PURIFICATION

(75) Inventors: Arjan Nicolaas Johan Van Keulen, Reading (GB); Jessica Grace Reinkingh, Frazer, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/508,903
(22) PCT Filed: Sep. 24, 1998
(86) PCT No.: PCT/GB98/02873
§ 371 (c)(1), (2), (4) Date: Jun. 15, 2000
(87) PCT Pub. No.: WO99/15460
PCT Pub. Date: Apr. 1, 1999

(30) Foreign Application Priority Data

Sep. 25, 1997 (GB) ............................................. 9720353

(51) Int. Cl.$^7$ ............................. C10K 1/34; C01B 3/50
(52) U.S. Cl. ..................... 423/247; 252/373; 422/172; 422/177; 422/190; 422/228; 423/248; 423/437.2; 429/12
(58) Field of Search ..................... 252/373; 422/172, 422/177, 190, 228; 423/246, 247, 248, 437.2, 650; 429/12

(56) References Cited

U.S. PATENT DOCUMENTS

| | | | |
|---|---|---|---|
| 4,447,410 A | * 5/1984 | Giammarco | 423/655 |
| 5,271,916 A | 12/1993 | Vanderborgh et al. | 423/246 |
| 6,120,925 A | * 9/2000 | Kawatsu et al. | 429/40 |

FOREIGN PATENT DOCUMENTS

| | | | |
|---|---|---|---|
| DE | 195 44 895 | 2/1997 | C01B/3/58 |
| EP | 0 321 739 | 6/1989 | C01B/3/12 |
| EP | 0 743 694 | 11/1996 | H01M/8/06 |
| EP | 0 834 948 | 4/1998 | H01M/8/06 |
| GB | 2 133 207 | 7/1984 | H01M/8/00 |
| JP | 58-152093 | 9/1983 | C10K/3/04 |

OTHER PUBLICATIONS

Search Report, United Kingdom, for corresponding application GB 9720353.3, dated Jan. 8, 1998.
International Search Report, for corresponding PCT application PCT/GB98/02873, dated Jul. 01, 1999.

* cited by examiner

Primary Examiner—Steven P. Griffin
Assistant Examiner—Maribel Medina
(74) Attorney, Agent, or Firm—Ratner & Prestia

(57) ABSTRACT

A process for purifying a gas stream containing hydrogen and carbon monoxide consisting of one or more catalysed reactions for the selective removal of carbon monoxide from the gas stream wherein a controlled amount of liquid water is introduced into the gas stream prior to some of the catalysed reactions so as to lower the temperature of the gas stream to a predetermined value at which preferential removal of carbon monoxide takes place in the associated catalysed reaction. The catalysed reactions may be selective oxidation, selective methanation or combination thereof. The process of the invention may be operated in combination with a water-gas shift reaction for the reduction of carbon monoxide in the hydrogen-containing gas stream.

29 Claims, 6 Drawing Sheets

HYDROGEN PURIFICATION

This application is the U.S. national-phase application of PCT International Application No. PCT/GB98/02873.

BACKGROUND OF THE INVENTION

Field of the Invention

This invention relates to a method of purifying hydrogen-rich gas streams which contain carbon monoxide and more particularly but not exclusively relates to a method of removing carbon monoxide from reformate gas mixtures.

Hydrogen is one of the most important industrial gases. It is used, for example, in ammonia synthesis, methanol synthesis, chemical hydrogenations, metal manufacture, glass processing and fuel cells. In most of these applications, the hydrogen has to be virtually free of any reactive contaminants.

Solid polymer fuel cells use hydrogen as a fuel. These fuel cells can be operated with a pure hydrogen stream or a hydrogen-rich stream. In vehicular applications, in order to avoid problems associated with hydrogen storage on board a vehicle, it can be preferable to produce the hydrogen on board the vehicle from conventional fuels. For example, a hydrogen-rich stream can be produced by reforming a conventional fuel with water and/or air in a fuel reformer. Such a hydrogen-rich stream typically contains hydrogen, CO, $CO_2$, $N_2$, $H_2O$ and traces of hydrocarbons or alcohols, (depending on the fuel).

As stated above, fuel reformers often produce small amounts of carbon monoxide (typically 0.5 to 5 mol %). Carbon monoxide is a severe poison to the fuel cell anode catalyst. Extremely small amounts of carbon monoxide have a detrimental effect on the cell voltage and reduce the fuel cell's power output. Hence, the carbon monoxide concentration needs to be attenuated to very low levels (preferably below 10 ppm) for the hydrogen-rich reformate to be suitable as fuel cell feed.

Fuel cell systems incorporating a fuel reformer require a carbon monoxide clean-up system which can reliably remove virtually all of the carbon monoxide. For vehicular applications, there are the additional requirements that such a system:

- works under varying flow conditions (through-put and carbon monoxide concentration);
- is compact;
- is economically feasible;
- introduces only a small pressure drop; and
- has a minimal start-up time.

Catalytic carbon monoxide removal options from a hydrogen-rich stream include:

- reduction of carbon monoxide with water vapour to carbon dioxide and hydrogen (water-gas shift);
- selective methanation of carbon monoxide to methane; and
- selective oxidation of carbon monoxide to carbon dioxide.

As currently practised, none of the above three options is ideal on its own for attenuating the carbon monoxide to the desired concentration below 10 ppm.

Water-gas Shift Reaction

The water-gas shift reaction would appear to be the most favourable because it produces hydrogen, which is fuel for the fuel cell. However, for the hydrogen-rich streams generated in fuel reformers it is not possible to reduce the carbon monoxide concentration to levels acceptable for the fuel cell by the water-gas shift reaction. This results from the fact that the water-gas shift reaction is an equilibrium reaction (also called a reversible reaction).

$$CO+H_2O(g) \leftrightarrows CO_2+H_2 -41.2 \text{ kJ/mole CO}$$

The equilibrium constant for this reaction is a function of the concentrations of the reactants and products as well as of the temperature. Whether the equilibrium conversion will be reached depends on the size of the catalyst bed, the catalyst activity, and the reactor operating conditions. The reaction rate of the water-gas shift reaction can generally be $$\text{Rate } CO = A \cdot \text{EXP}\left(\frac{-E_a}{RT}\right) \cdot [CO][H_2] \cdot \left(K_{eq} - \frac{[H_2][CO_2]}{[CO][H_2O]}\right) \quad \text{Equation A}$$

where,

A=reaction rate constant
Ea=reaction activation energy
R=gas constant
T=absolute temperature $$K_{eq} = \frac{[H_2]_{eq}[CO_2]_{eq}}{[CO]_{eq}[H_2O]_{eq}}$$

FIG. 4 of the accompanying drawings shows the dry CO percentages from a water-gas shift reaction as a function of temperature and water inlet concentration. The dry feed here is 58% $H_2$, 21% $CO_2$, 19.5% $N_2$ and 1.5% CO. This figure demonstrates that at low temperatures and increasing $H_2O$ levels in the feed, the CO concentration in the product is predicted to be quite low based on thermodynamics. In practice, however, these low levels will not be reached because the reaction rate becomes extremely slow at low temperatures as it approaches equilibrium. Equation A illustrates that the reaction rate is exponentially dependent on the temperature. The last term in Equation A shows that if the reaction mixture approaches equilibrium concentrations, the reaction rate approaches zero. Hence, practical water-gas shift reactors usually can only bring the CO concentration down to 0.5–1.0 mol % dry. Depending on the reformer technology, and thus on the amount of CO in the reformate product, one or more water-gas shift reactors (or reactor stages) could be used to reduce the CO to levels suitable for further removal by selective oxidation and/or methanation.

Selective Methanation

Two methanation reactions are possible:

$$CO+3H_2 \rightarrow CH_4+H_2O(g) -206.2 \text{ kJ/mole CO}$$

$$CO_2+4H_2 \rightarrow CH_4+2H_2O(g) -163.1 \text{ kJ/mole } CO_2$$

Selective methanation of carbon monoxide is only an option when the carbon monoxide concentration in the feed stream to the methanation reactor is sufficiently low (4000 to 100 ppm) so that hydrogen losses are minimised. The methanation process has the major disadvantage that for each molecule of carbon monoxide removed, three molecules of hydrogen are lost. Thus, if the initial carbon monoxide concentrations are high then the hydrogen loss will be significant. Moreover, although selective methanation is an exothermic reaction, if the carbon monoxide concentration in the feed stream to the methanator is low the temperature rise in the methanation is not too great. If carbon dioxide is present in the feed stream, it is important that a selective methanation reactor is operated at a temperature low enough to minimise carbon dioxide methanation to methane and water as a side reaction. For these reasons, a methanation reactor either needs to be cooled or requires a carefully controlled feed inlet temperature.

Selective Oxidation

Two oxidation reactions are possible:

$$CO + \tfrac{1}{2}O_2 \rightarrow CO_2 - 283.1 \text{ kJ/mole CO}$$

$$H_2 + \tfrac{1}{2}O_2 \rightarrow H_2O(g) - 242.0 \text{ kJ/mole } H_2$$

As shown above, carbon monoxide can be removed from a hydrogen-rich stream by selective oxidation. This selectivity is relatively easy to achieve at high carbon monoxide concentrations. However, at lower carbon monoxide concentrations where hydrogen is present in a large excess, the hydrogen becomes more competitive and the high selectivity for carbon monoxide is lost. Also, the amount of oxygen injected into the system is important as any excess will tend to react with hydrogen. Thus, if carbon monoxide selectivity decreases and oxygen reacts with hydrogen there will not be enough oxygen left to remove all the carbon monoxide. If extra oxygen is used, hydrogen loss can be significant. Moreover, the levels of carbon monoxide produced by a fuel reformer may vary with time. Thus, the amount of oxygen required to remove the carbon monoxide will vary. Furthermore, as the oxidation reaction is highly exothermic, changes in the amount of oxygen will lead to temperature variations in the catalyst bed. The selectivity of the oxidation reaction is highly temperature dependent and an increase in the amount of oxygen added could result in an increase in the final carbon monoxide level. In summary, it is easy to achieve a reduction in carbon monoxide by selective oxidation from 0.1 to 10 vol % to levels between 350 to 750 ppm with little loss of hydrogen. However, in practice it is very difficult to reach very low carbon monoxide concentrations by selective oxidation alone, without excessive loss of hydrogen.

Description of the Related Art

U.S. Pat. No. 5,271,916 describes the selective removal of carbon monoxide from a hydrogen-rich gas stream by oxidation in a multi-stage system. This system includes two or more catalytic reactors with inter-stage heat exchangers. The hydrogen-rich stream is fed to the first reactor together with a pre-determined amount of oxygen or air. During the exothermic oxidation reaction, the catalyst temperature rises and hence the temperature of the exit stream from the first reactor is higher than the temperature of the entry stream for the first reactor. At higher temperatures, the reaction becomes less selective towards carbon monoxide combustion, and so the temperature of the exit gas stream from the first reactor is reduced in a heat exchanger. The product gas from the heat exchanger is then fed to a second oxidation reactor, where again oxygen is introduced to further decrease the concentration of the carbon monoxide.

The required duties of inter-stage heat exchangers in a multi-stage carbon monoxide clean-up system vary over a wide range since the total flows can vary by up to a factor of ten. In order to fulfil its cooling duties in such a system, a conventional heat exchanger would not be appropriate unless the area could be changed as well. The latter is possible, for example having some of the process gas bypassing the heat exchanger. The cooled gas and the bypassed gas would come together before entering the next stage of the multi-stage process. By tuning the amount of bypass gas relative to the gas which is cooled, a wide range of overall duties for the heat exchanger can be achieved. This is a well known principle. However, the size of such heat exchangers, as well as the pressure drop involved, makes them unattractive for the requirements of a compact hydrogen clean-up system for vehicular applications. Alternatively, cooling can be provided in a heat exchanger by evaporating a liquid on one side of the exchanger tubes and extracting heat from the process gas on the other side of the tubes. However, once again it is not an attractive proposition for vehicular applications to have a reservoir with boiling liquid on board a vehicle.

European Patent Specification number 0321739 A2 and Japanese Published Specification number 58-152093 relate to the removal of carbon monoxide in hydrogen-rich gas streams by means of the water-gas shift reaction in which water is a reactant.

European Patent Specification number 0834948 A2 describes a method of reducing the carbon monoxide in a hydrogen-rich gas stream by selective oxidation. The selective oxidation catalyst, applied to an inert carrier and in the form of pellets, is cooled by supplying water directly onto the pellets thereby regulating the temperature of the catalyst particles.

SUMMARY OF THE INVENTION

One object of the present invention is to provide an improved and simplified carbon monoxide clean-up system for vehicular fuel cell systems which is compact, simple to assemble and is capable of dealing with varying flow rates of hydrogen-rich gas and varying levels of carbon monoxide.

Accordingly, the present invention provides a process for purifying a gas stream containing hydrogen and carbon monoxide which process comprises a catalysed reaction for the selective removal of carbon monoxide from the gas stream wherein a controlled amount of liquid water is introduced into the gas stream prior to the catalysed reaction so as to lower the temperature of the gas stream to a predetermined value at which preferential removal of carbon monoxide takes place in the catalysed reaction.

Suitably, the liquid water introduced into the gas stream is mixed with the gas stream and vaporised prior to the catalysed reaction.

Conveniently, the water vaporisation and mixing with the gas stream is enhanced by placing gas distribution means in the flow path of the mixture of water and the gas stream.

Preferably, the gas distribution means comprises at least one of an inert packing material, one or more static mixers and one or more baffles. Further preferably the inert packing material comprises glass beads, ceramic pellets or metal wool or mesh.

The catalysed removal of carbon monoxide can be by selective oxidation, selective methanation or combinations thereof.

Suitably, the catalysed reaction comprises a selective oxidation reaction and air or oxygen is introduced into the gas stream prior to the catalysed reaction.

Preferably, air or oxygen is fully mixed with the gas stream prior to the catalysed reaction.

Further preferably, air or oxygen is introduced into the gas stream either before or at the same point where water is introduced into the gas stream so as to be mixed simultaneously with the water and the gas stream.

Alternatively, air or oxygen is added to the gas stream after introduction of water to the gas stream.

The process of the invention may comprise two or more catalysed reactions for the selective removal of carbon monoxide from the gas stream and liquid water may be introduced to only some of the catalysed reactions.

Depending on the gas stream temperature and composition, the system may not require water injection before every stage. Since the various catalytic stages may have different catalysts particularly well suited to reduce the CO in a certain CO concentration range by either selective oxidation or methanation, the gas outlet temperature of one stage may be the preferred gas inlet temperature of the following stage. Similarly, the temperature of the reformate coming from a reformer or water-gas shift reactor may be well suited for the first catalytic stage. Moreover, some of the catalyst stages may be designed to operate at a certain temperature so as to eliminate one or more cooling stages by water addition.

Depending on the destination of the hydrogen-rich product from the hydrogen clean-up unit, the hydrogen-rich product may be cooled by yet another water injection stage after the last hydrogen clean-up stage. For example, if the hydrogen-rich stream is the fuel for a solid polymer fuel cell, the preferred inlet temperature of the latter is typically in the range 60–90° C. Generally, the fuel cell benefits by operation on a fully humidified fuel. Especially, when the fuel cell is operated at lower pressures (1–2 bars), the reformate fuel may not be saturated as it exits the last hydrogen purification stage. Hence, another water injection stage to cool as well as further humidify the hydrogen-rich stream may also be included in the process of present invention.

Fully vaporising and mixing the injected water with the gas stream prior to the associated catalyst bed minimises temperature differences in the catalyst bed in the radial direction and results overall in a more even temperature profile, enhancing the selectivity of the catalysed reaction. If the injected water is not fully vaporised, liquid water may hit the catalyst. Upon vaporisation from the catalyst, this is likely to cause considerable thermal stress to the catalyst pellets or monolith, eventually resulting in catalyst degradation and de-activation.

Where selective oxidation is involved, the added air is also fully mixed with the gas stream before the associated catalyst bed. As with the water, if the air is not well mixed with the gas stream significant temperature differences may occur in the catalyst bed. Part of the bed may receive gas stream with a higher oxygen level, and the temperature rise will be higher while the selectivity will be lower. Other parts of the catalyst bed may receive gas stream with lower oxygen concentrations. This may locally extinguish the reaction, causing the gas stream to pass through the bed without conversion of carbon monoxide.

Depending on the gas stream temperature and as indicated above, the air can be introduced before or at the same place as where the water is injected. In this arrangement the air and water will be mixed simultaneously with the gas stream. However, if the gas stream is too high in temperature (>300° C., depending on the gas stream composition) the introduction of air may initiate gas phase combustion. The latter is very undesirable because of explosion danger and the non-selectivity of the process. If the gas stream is too high in temperature it is important to introduce the air downstream of the water-cooling stage. Another static mixing unit may be necessary to mix the air and gas stream prior to the catalyst stage.

Another way to enhance the mixing of the air or oxygen with the gas stream is by introducing it to the gas stream in a tube with multiple holes. The air or oxygen will then enter the system throughout the width/height of the unit.

Another way to enhance mixing of air or oxygen and water with the gas stream can be accomplished by introducing the water and air or oxygen both through a single injector (eg a two-fluid nozzle).

In one embodiment of the invention the gas stream is a reformate gas mixture.

Preferably, the catalyst for each catalysed reaction is a supported noble metal or base metal catalyst suitable for that reaction.

Suitably, the concentration of carbon monoxide in the gas stream is reduced to below 10 ppm.

Suitably, the process of the invention can be operated in combination with a water-gas shift reaction for the reduction of carbon monoxide in the hydrogen-containing gas stream.

The present invention also provides a multi-bed catalyst system for the purification of a gas stream containing hydrogen and carbon monoxide which operates in accordance with the process as claimed herein.

From another aspect the present invention is apparatus for purifying a hydrogen-rich gas stream which contains carbon monoxide comprising a catalysed reaction zone in which carbon monoxide is selectively removed from the gas stream and means for introducing a controlled amount of liquid water into the gas stream prior to the catalysed reaction zone so as to lower the temperature of the gas stream to a predetermined value at which the preferential removal of carbon monoxide from the gas stream takes place in the catalyst reaction zone.

Preferably, the apparatus is provided with means for mixing the liquid water with the gas stream and vaporising the liquid water prior to the catalysed reaction zone.

Further preferably, the apparatus is provided with gas distribution means located in the flow path of the mixture of liquid water and the gas stream in order to enhance mixing of the liquid water and the gas stream and vaporisation of the liquid water.

Conveniently, the gas distribution means comprises at least one of an inert packing material, one or more static mixers and one or more baffles.

Suitably, the inert packing material comprises glass beads, ceramic pellets, or metal or wool mesh.

In one embodiment, the catalysed reaction zone contains a catalyst for the selective oxidation of carbon monoxide.

In said embodiment, the apparatus is provided with means for introducing air or oxygen into the gas stream prior to the catalysed reaction zone.

Preferably, air or oxygen is fully mixed with the gas stream prior to the catalysed reaction zone.

Further preferably, air or oxygen is introduced into the gas stream either before or at the same point where water is introduced into the gas stream so as to be mixed simultaneously with the water and the gas stream.

Alternatively, air or oxygen may be added to the gas stream after introduction of water to the gas stream.

In another embodiment, the catalysed reaction zone contains a catalyst for the selective methanation of carbon monoxide.

From another aspect, the present invention is a multi-stage hydrogen clean-up system comprising two or more units of apparatus as described above, all of said units being based on selective oxidation of carbon monoxide or all of said units being based on selective methanation of carbon monoxide or said units being a combination of selective oxidation and selective methanation units.

From yet another aspect, the present invention is an on-board fuel cell system for vehicular application comprising (a) a hydrogen production unit; (b) a hydrogen clean-up unit and (c) a fuel cell wherein the hydrogen clean-up unit comprises apparatus as described above.

In addition to fuel cells, the process and apparatus of the invention can be used for the purification of hydrogen in many other industrial applications, eg ammonia synthesis, chemical hydrogenations etc.

The number of stages required to reduce carbon monoxide from a hydrogen-rich stream to levels acceptable for fuel cells depends on the composition of the hydrogen-rich stream, in particular the carbon monoxide content but other gas constituents may also affect the conversion and selectivity. Furthermore, the choice of catalyst can have an impact on the number of reaction stages. Both the activity and the selectivity of a catalyst for carbon monoxide oxidation, for example, can influence the carbon monoxide conversion that can be attained in a particular stage. There is no limit on the number of stages that can be used in the process of the present invention. Each stage can consist of a different catalyst aimed at performing a different reaction, eg selective oxidation, selective methanation or combinations thereof. As stated above, before each stage, the catalyst temperature is decreased by adding liquid water to process stream, which will decrease the temperature of the process stream upon evaporation. The amount of liquid water introduced to the gas steam can be controlled by measurement of the gas stream temperature after the water introduction. Preferably, a thermo couple is placed in the gas stream after the water injection but before the catalyst bed. The temperature read-out can then be compared to a suitable set-point, and the water addition can be adjusted accordingly.

BRIEF DESCRIPTION OF THE DRAWINGS

Embodiments of the present invention are described below, by way of example only, with reference to the accompanying drawings in which.

DETAILED DESCRIPTION OF THE INVENTION

Figure 1:
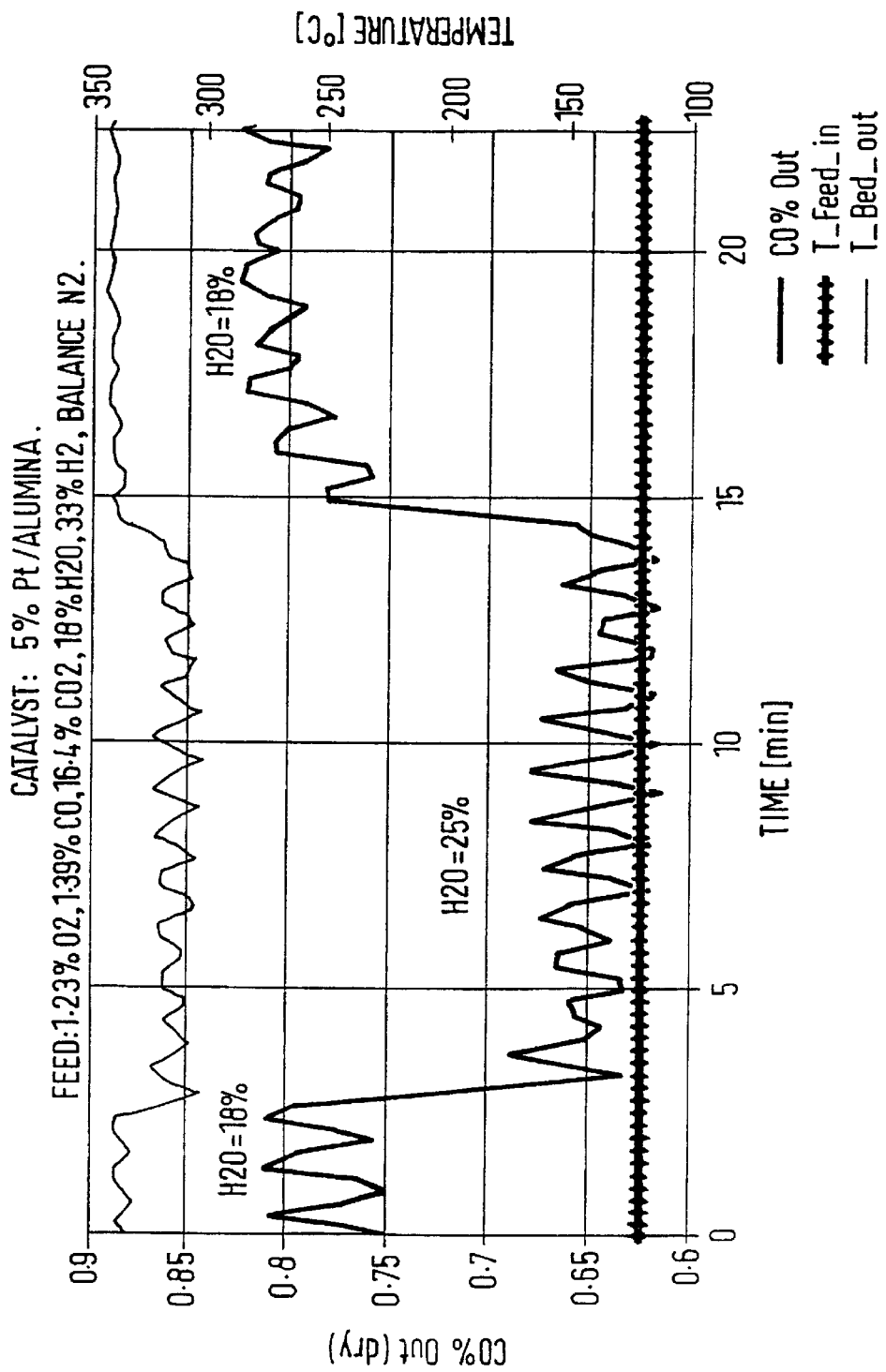
FIG. 1 presents graphs illustrating the effect of water injection on carbon monoxide selectivity in a catalytic oxidation reaction.

Effect of Water-Injection on Carbon Monoxide Selectivity (FIG. 1)

0.65 g of a 5% $Pt/Al_2O_3$ catalyst in powder form (particle diameter 350 to 500 μm) was placed in a tubular quartz reactor. A synthetic reformate gas mixture of composition 33% $H_2$, 16.4% $CO_2$, 1.23% $O_2$, 1.39% CO, 18% $H_2O$ and $N_2$ (30.2%) was made up. The total gas flow was 2.44NL/minute. The gas mixture was preheated in a section of quartz tube prior to the catalyst bed. Thermocouples were placed immediately before the catalyst bed and in the catalyst bed. On exit from the catalyst bed, the process stream was dried in a condenser and Permapure membrane. The dried exit gas was continuously analysed for carbon monoxide and oxygen concentration.

Figure 2:
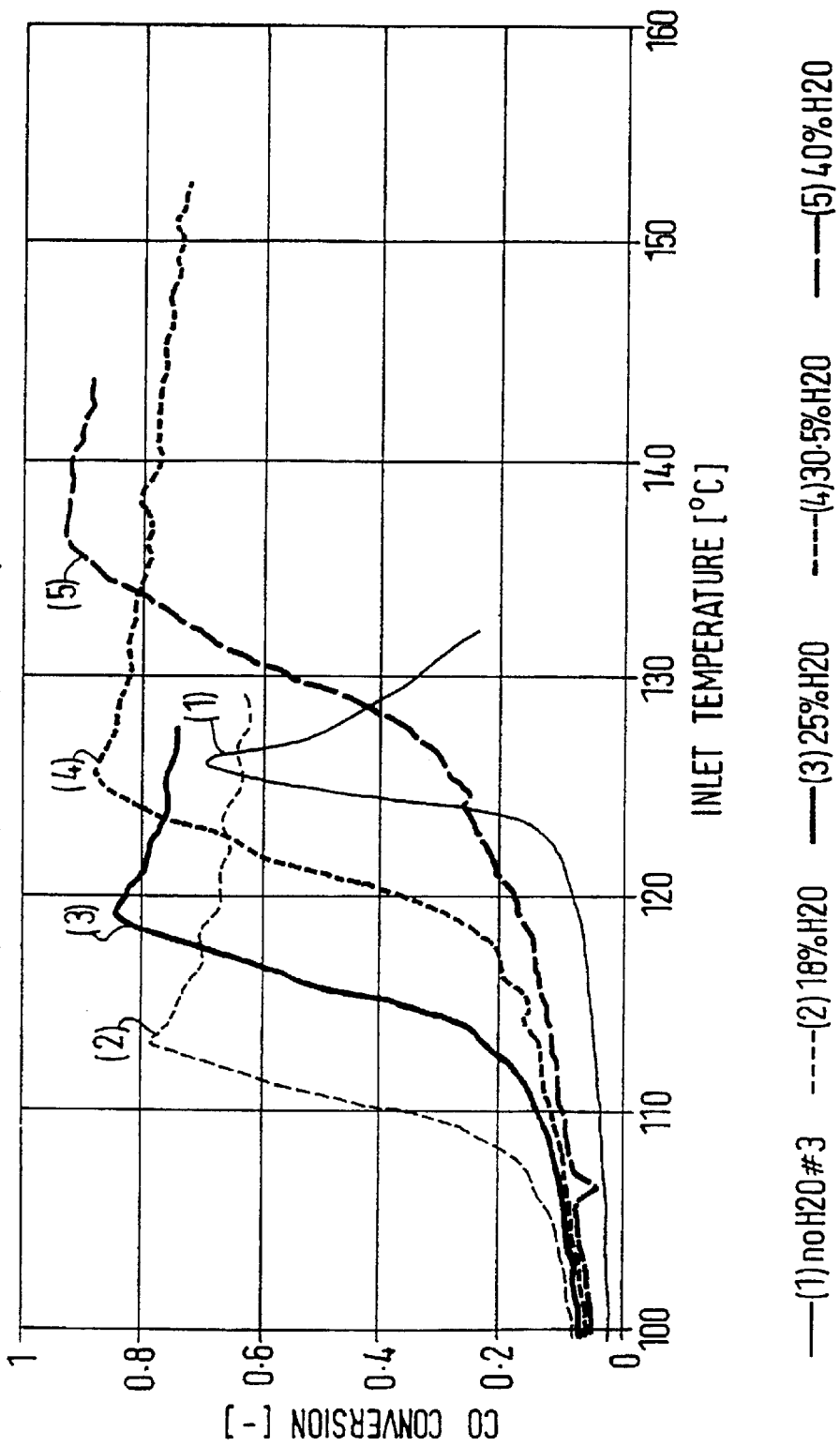
FIG. 2 shows the increase in the operating window of a selective oxidation reaction obtained by the addition of water to a hydrogen-rich feed gas.

FIG. 2 shows the carbon monoxide output in mol % based on the dry gas mixture (CO in is 1.7% dry). The inlet temperature in this example is 120° C. The oxygen conversion was always 100%. For the above gas mixture, CO out is around 0.77%, corresponding to a conversion of 55% and a selectivity of 0.61 (mols CO converted/mols $H_2$ converted).

At time t=3 minutes, the water feed was increased, whilst keeping all other gas flows the same, such that the water concentration is increased by 7% to become 25%. It can be seen that CO out decreases to about 0.65%, corresponding to a conversion of 62% and a selectivity of 0.75. It can also be seen that the temperature in the catalyst bed decreases from 340° C. to 320° C.

At time t=14 minutes the water feed was re-set to the initial value. The exit temperature and CO out rose to their initial values.

Increase in Operating Window (FIG. 2)

FIG. 2 illustrates the carbon monoxide conversion over the same 5%$Pt/Al_2O_3$ catalyst referred to as above. The composition of the synthetic dry gas feed mixture is 40% $H_2$, 20% $CO_2$, 1.5% $O_2$, 1.7% CO and the balance is $N_2$ (around 37%) with a total flow rate of 2NL/minute. This gas mixture was fed to the reactor increasing the inlet temperature at a rate of 3° C./minute. The carbon monoxide concentration was measured in the exit gas. Such a temperature increase was carried out without water addition and with various amounts of water added to the dry gas mixture.

FIG. 2 shows that the maximum conversion of carbon monoxide is increased with increasing water content in the hydrogen-rich mixture. Curve (1) in FIG. 3 corresponds to the conversion profile when no water is added to the hydrogen-rich mixture. This curve (1) is sharp and indicates that there is only a small optimum temperature range in which high carbon monoxide conversions can be reached. Curves (2) to (5) correspond to the carbon monoxide conversion versus inlet temperature for hydrogen-rich feeds with water included. The curves demonstrate the broadening of the conversion profile versus temperatue, as well as a higher maximum conversion, as a function of water concentration in the hydrogen-rich feed gas.

Figure 3:
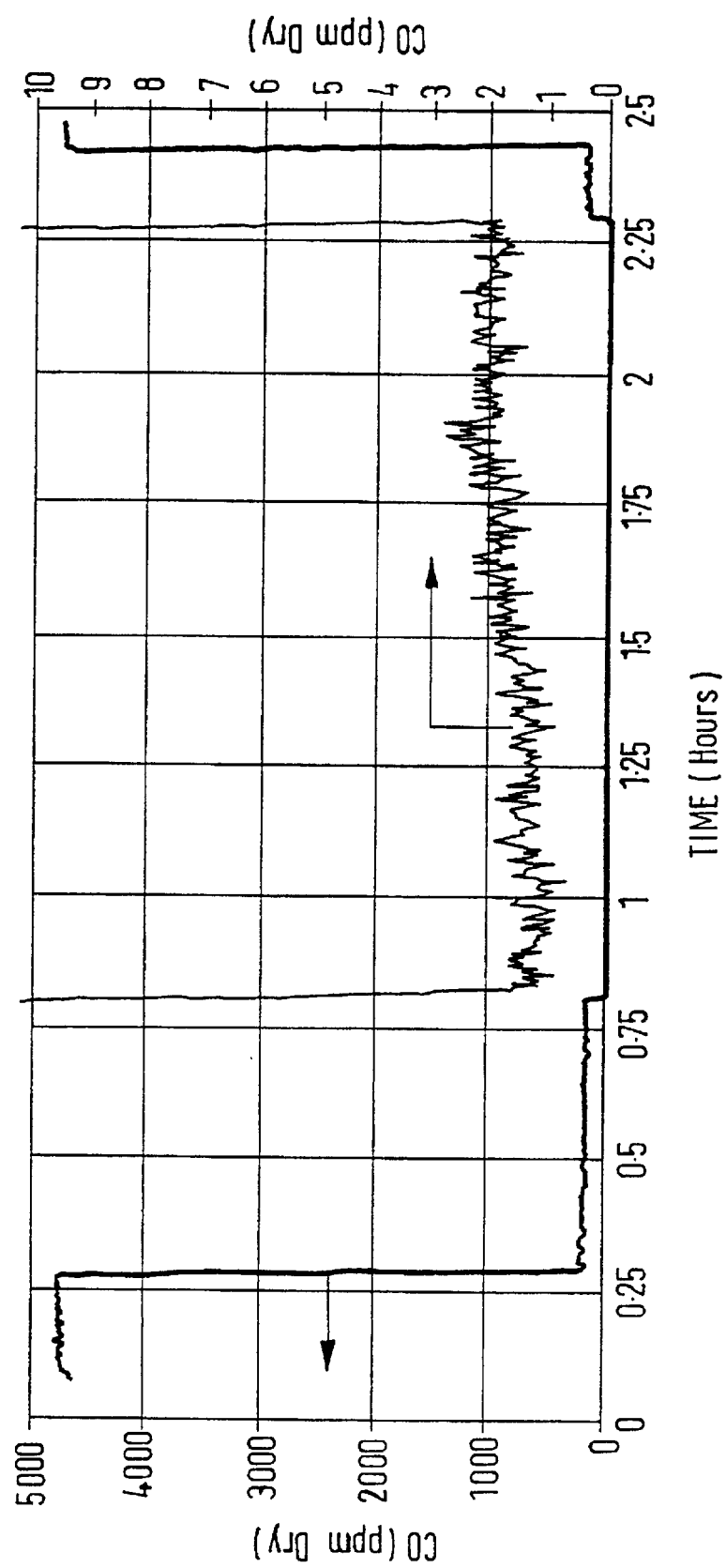
FIG. 3 shows the carbon monoxide outlet concentration versus time for a two-stage carbon monoxide clean-up system according to the invention.

Example of Two-Stage Clean-Up System (FIG. 3)

A two-stage CO clean-up system with water injection according to the invention was tested. Each stage consisted of a Pt-based selective oxidation catalyst. The catalyst in the first stage was a 5%$Pt/Al_2O_3$ catalyst (35 g) supported by a ceramic monolith, L=120 mm, D=45 mm. The catalyst in the second stage was 0.5%Pt/zeolite 4A pellets (total weight 80 g dry). A Pt/zeolite catalyst was chosen for the second stage because it is much more selective for CO removal at lower concentrations. Located prior to each catalyst was an air injector, a water injector and a static mixer to enhance mixing. The water injection rate was controlled by a Proportional Integral Derivative (PID) controller, the rate being adjusted by comparing the measured gas temperature before the catalyst and the set temperature.

The feed gas, 3.17 mol/min (~72 liter/min at 0° C. 1 bar) consisting of 36 mol % $H_2$, 17 mol % $CO_2$, 29 mol %, $N_2$, 0.4 mol % CO and 17.6 mol % $H_2O$, was heated to 207° C. (typical reformer including water-gas shift reactor outlet conditions). To this stream 1.5 liter/min air was added, as well as a controlled amount of liquid water to decrease the temperature to 150° C. The amount of water added during the experiment was not measured, but it was calculated to be in the order of 0.11 kg/hour, depending on the heat losses from the system to the environment. The reformate/air/water mixture at the desired temperature entered the first supported catalyst bed, where typically 95% of the CO was converted to $CO_2$. The composition of the reformate stream after the first catalyst bed was 34 mol % $H_2$, 16.5 mol % $CO_2$, 29 mol % $N_2$, 150 ppm CO and 20.5 mol % $H_2O$.

The outlet stream from the first catalyst bed was around 208° C. Similarly as with the first catalyst bed, 0.5 liter/min air and liquid water were added to the gas stream decreasing the temperature to 140–145° C., which is the desired inlet temperature for the second catalyst bed. Again, the amount of water added during the experiment was not measured, but it was calculated to be in the order of 0.15 kg/hour. The composition of the reformate stream after the second catalyst bed was 32 mol % $H_2$, 16 mol % $CO_2$, 28.5 mol % $N_2$, approximately 2 ppm CO and 23.5 mol % $H_2O$.

Figure 4:
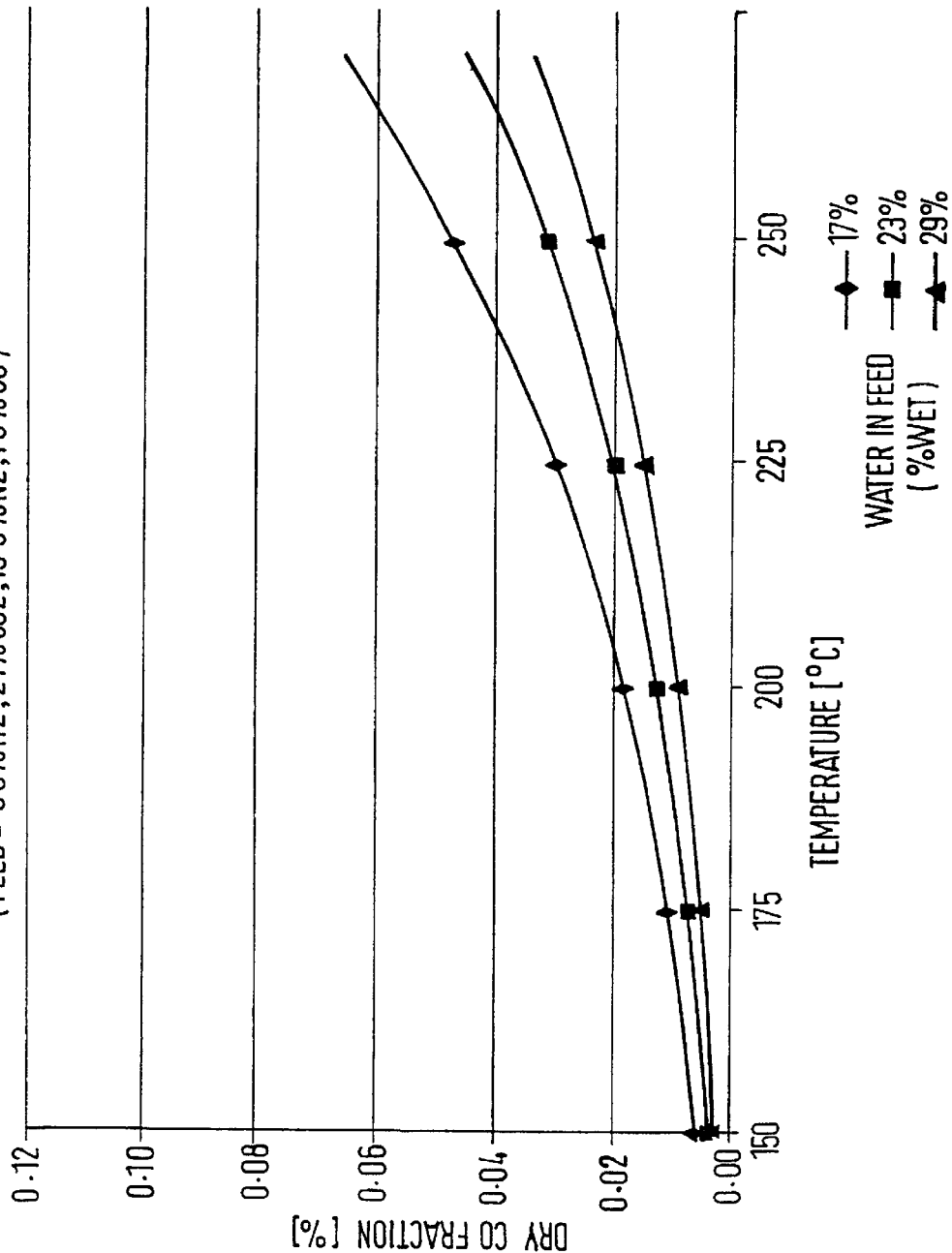
FIG. 4 shows the dry carbon monoxide percentages from a water-gas shift reaction as a function of temperature and water inlet concentration.

During the above experiment the CO outlet concentration was continuously measured with an infrared CO analyser. FIG. 4 shows the CO outlet concentration (dry) versus time. From time 0 to 0.285 hours, no air was added to the system and the CO outlet concentration was measured to be 4700 ppm (dry). At 0.285 hours 1.5 liter/min of air was added to the first stage, causing the CO outlet concentration to fall to 150±20 ppm (dry). At 0.8 hours 0.5 liter/min of air was added to the reformate before the second catalyst bed. It can be seen that the CO outlet concentration is measured to be between 1 to 3 ppm, sufficiently low to feed to a PEM fuel cell. When at 2.3 hours, the air to the second stage was stopped, the same CO output level was obtained as before. At 2.44 hours, all air supply was stopped and the dry CO outlet concentration was measured to be 4700 ppm.

Dry Carbon Monoxide Percentages from a Water-Gas Shift Reaction as a Function of Temperature and Water inlet Concentration (FIG. 4)

See explanation of FIG. 4 on page 3 under the heading "Water-gas Shift Reaction".

Figure 5:
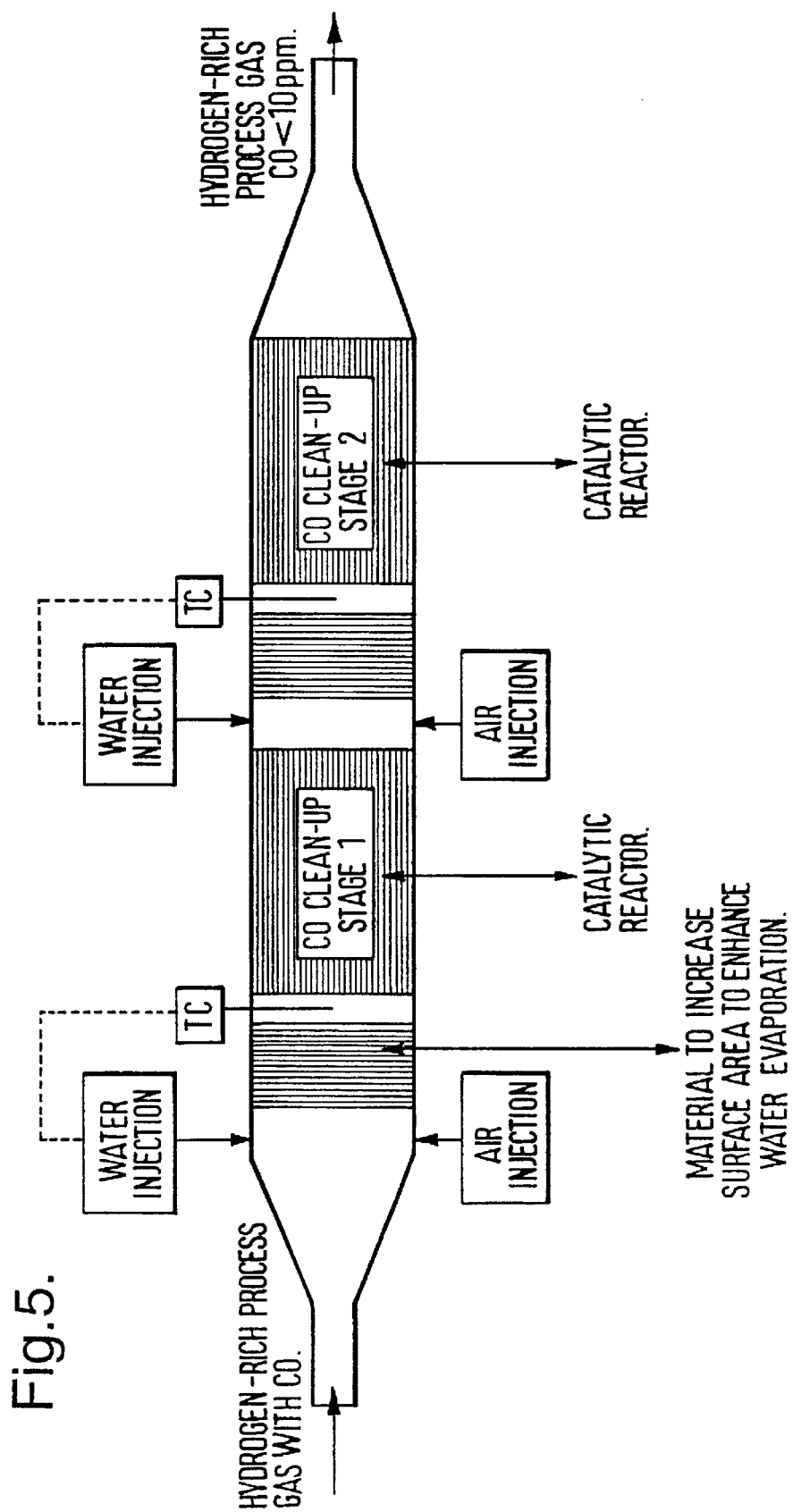
FIG. 5 is a schematic diagram of a carbon monoxide clean-up system according to the invention which employs two catalytic oxidation steps.

Two-stage Carbon Monoxide Clean-up Assembly (FIG. 5)

Referring to FIG. 5, here is illustrated an example of a carbon monoxide clean-up assembly according to the invention employing two selective oxidation stages. It is to be understood, however, that the second stage could be a selective methanation stage employing a suitable catalyst. As both selective oxidation and selective methanation reactions are exothermic, in order to selectively remove carbon monoxide, the hydrogen-rich process gas stream is cooled by liquid water injection to an appropriate predetermined temperature before each stage. By means of liquid water addition, the process streams can be cooled quickly. Water can be added to the process streams by vaporising it from a frit which is in contact with a water reservoir. Alternatively, water can be injected by a liquid injector. In such an injector, liquid water is divided into a fine spray of water droplets. The small droplets vaporise rapidly upon contacting the hot process gas. The evaporation can be enhanced by placing a high surface area material in the reactor tubes, eg stainless steel wool, static mixers, baffles or other means for creating a large surface area without introducing a substantial pressure drop.

Figure 6:
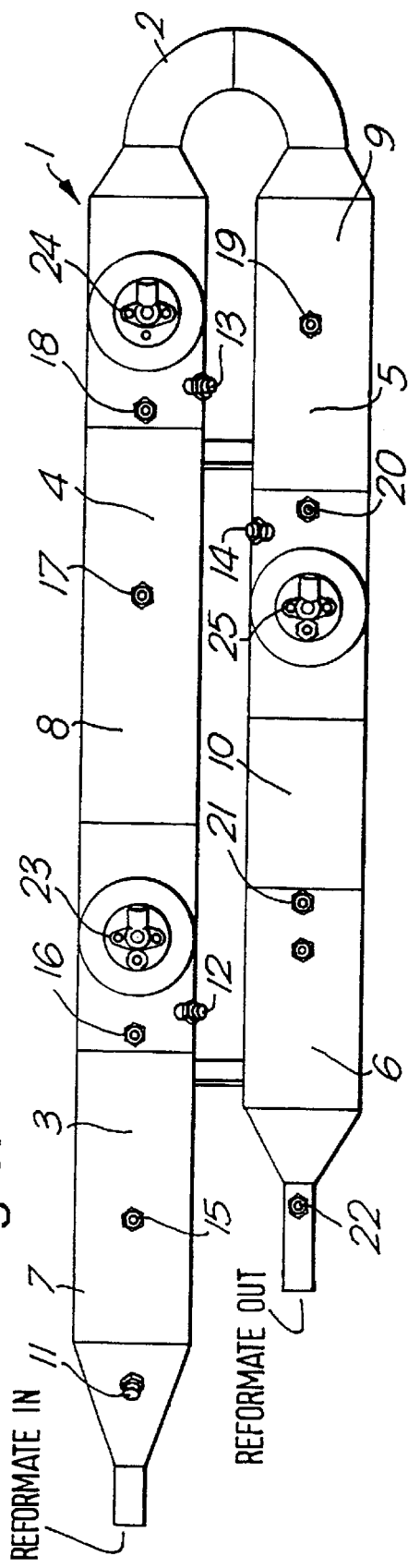
FIG. 6 is a plan view of a carbon monoxide clean-up system according to the invention which employs four catalytic oxidation stages.
Figure 7:
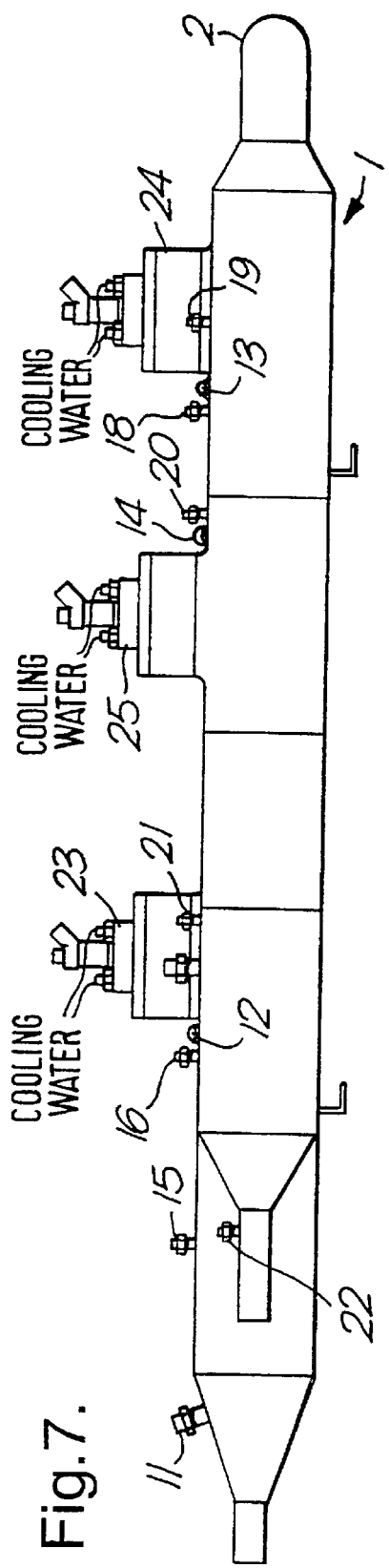
FIG. 7 is an elevation of the clean-up system shown in FIG. 6.

Four-Stage Carbon Monoxide Clean-up Assembly (FIGS. 6 and 7)

FIGS. 6 and 7 illustrate a carbon monoxide clean-up assembly according to the invention employing four selective oxidation stages. The assembly 1 is a one-piece welded cylindrical construction provided with a bend 2 to reduce its length. The assembly contains four catalyst bed zones 3, 4, 5 and 6 and four gas mixing zones 7, 8, 9 and 10. The assembly is fitted with air injectors 11, 12, 13 and 14, thermocouples 15, 16, 17, 18, 19, 20, 21 and 22 and water injectors 23, 24 and 25. The mixing zones 7, 8, 9 and 10 have various gas mixers (not shown) installed (static mixers and/or stainless steel wool mesh and/or baffles). The water vaporising zones are immediately below the water injectors 23, 24 and 25 and the vaporising zones also are fitted with any one or more of static mixers, stainless steel wool mesh and baffles. The results of three test runs are shown below. In each test run, catalyst bed zones 3 and 4 contained 5% by weight $Pt/Al_2O_3$ catalyst (washcoated onto a monolith) and catalyst bed zones 5 and 6 contained 1% by weight Pt/Zeolite 4A (as extrudates).

| TEST RUN 1 | | |
|---|---|---|
| Gas | Flow rates for 0.6% CO slpm and CO level achieved Total flow 372 slpm | |
| $H_2$ | 150 | 40% |
| $N_2$ | 130 | 35% |
| $CO_2$ | 75 | 20% |
| CO | 2 | 0.54% |
| $H_2O$ | 15 | 4% |
| Air Feed 11 | 10 | |
| Air Feed 12 | 3 | |
| Air Feed 13 | 2 | |
| Air Feed 14 | 1 | |
| CO achieved | 4 ppm | |

| Typical operating temperatures (° C.) for 0.6% CO | | | | |
|---|---|---|---|---|
| Catalyst | IN | | OUT | |
| 3 | 154 | TC15 | 236 | TC16 |
| 4 | 167 | TC17 | 184 | TC18 |
| 5 | 127 | TC19 | 143 | TC20 |
| 6 | 128 | TC21 | 132 | TC22 |

Water injector 23 set at 150° C.
Water injector 24 set at 140° C.
Water injector 25 not used.

| TEST RUN 2 | | |
|---|---|---|
| Gas | Flow rates for 1% CO, slpm and CO level achieved Total flow 372 slpm | |
| $H_2$ | 150 | 40% |
| $N_2$ | 130 | 35% |

-continued

TEST RUN 2

| $CO_2$ | 75 | 20% |
| CO | 3.33 | 1% |
| $H_2O$ | 15 | 4% |
| Air Feed 11 | 12 | |
| Air Feed 12 | 3 | |
| Air Feed 13 | 2 | |
| Air Feed 14 | 1 | |
| CO achieved | 5 ppm | |

Typical operating temperatures (° C.) for 0.6% CO

| Catalyst | IN | | OUT | |
| --- | --- | --- | --- | --- |
| 3 | 155 | TC15 | 263 | TC16 |
| 4 | 172 | TC17 | 197 | TC18 |
| 5 | 133 | TC19 | 150 | TC20 |
| 6 | 136 | TC21 | 140 | TC22 |

Water injection 23 set at 150° C.

Water injection 24 set at 140° C.

Water injection 25 not used.

TEST RUN 3

| | Concentrations (dry) (Vol %) |
| --- | --- |
| Inlet: | $H_2$ = 37.5 |
| | $N_2$ = 40.0 |
| | CO = 0.5 |
| | $CH_4$ = 1.8 |
| | $CO_2$ = 19.8 |
| | $C_2H_6$ = 0.4 |
| | $H_2O$ = 38% |
| | Flow = 1275 slm |
| Outlet: | $H_2$ = 36.1 |
| | $N_2$ = 41.9 |
| | CO = 3–5 ppm (dry) |
| | $CH_4$ = 1.8 |
| | $CO_2$ = 19.8 |
| | $C_2H_6$ = 0.4 |

Typical Operating Temperatures (° C.)

| $TC_{15}$ = 162 | $TC_{17}$ = 170 | $TC_{19}$ = 131 | $TC_{21}$ = 120 |
| $TC_{16}$ = 197 | $TC_{18}$ = 181 | $TC_{20}$ = 133 | $TC_{22}$ = 114 |

Air Feed 11 = 15 slm
Air Feed 12 = 3 slm
Air Feed 13 = 2 slm
Air Feed 14 = 1 slm Water injector 23 set at 170° C.

Water injector 24 set at 130° C.

Water injector 25 not used.

Notable advantages and features pertaining to the present invention include those listed below:

(a) One advantage of using water addition to the hydrogen-rich gas stream as a means of cooling is the fact that cooling can be provided over a wide range of cooling requirements. Especially when injectors are used to introduce the water, the control is easy and fast, while pressure drops are negligible.

(b) An additional advantage of introducing water into the hydrogen-rich gas stream is the enhanced selectivity of carbon monoxide oxidation over hydrogen oxidation, in a typical selective oxidation stage. The water addition not only decreases the temperature of the process gas, it also increases the total flow or thermal mass of the process gas. After water addition, the associated reactor temperature will be slightly lower, because of the increased thermal mass of the process gas. This lower temperature has a beneficial effect on the selectivity thus avoiding wastage of hydrogen.

(c) Fully vaporising and mixing the injected water with the hydrogen-rich gas stream prior to the associated catalyst bed has major advantages over injecting water directly onto the catalyst bed. In the latter case, the liquid water boils on the catalyst surface (or in the pores) which can cause thermal stress and erosion which are forms of catalyst degradation which reduce the lifetime of the catalyst. Additionally, with injection of water directly onto the catalyst particles, it is extremely difficult to distribute the water equally throughout the reactor cross-section. Small imperfections in the injector spray or changes in the gas flow pattern can immediately result in maldistribution of the liquid water, causing temperature differences in the catalyst bed. Such temperature differences can result in parts of the catalyst bed only partially functioning or ceasing to function altogether. This is particularly true if the catalytic stage is of a monolithic structure. In a monolithic catalyst stage, which in general is the preferred catalyst substrate due to its structural strength, there is no exchange of gases between the different channels in the radical direction.

(d) Another important effect of water addition to the hydrogen-rich gas stream on the selectivity of the selective oxidation stages is the decrease in the equilibrium constant for the reverse water-gas shift reaction ($CO_2+H_2 \rightleftharpoons CO+H_2O$). The latter reaction becomes active at the higher temperature in the reactor stage, but is suppressed by higher concentrations of water. In addition to the increase in selectivity, the operating window of a carbon monoxide clean-up reactor widens with increasing water in the hydrogen-rich gas stream, ie the carbon monoxide conversion is less dependent on the reactor temperature.

(e) The process of the present invention is superior to known processes for the removal of carbon monoxide from hydrogen-rich gas streams by selective oxidation because both water and air injection are staged. This means that there are two control variables for maintaining the catalyst beds within their optimum temperature range, namely:

(a) control of the gas inlet temperature by water injection; and (b) control of the amount of CO oxidation that can occur in each catalyst bed by the amount of air that is added.

(f) After going through the carbon monoxide clean-up system, the hydrogen-rich stream is cooled to the required temperature for the fuel cell; (generally 70 to 90° C. for a PEM fuel cell). Depending on the initial water concentration of the hydrogen-rich stream, the hydrogen-rich stream is still saturated at the fuel cell operating temperature. The fuel cell can then be equipped with a smaller humidification section or no such section might be required. The latter would decrease the size and pressure drop of the fuel cell.

(g) Finally, the carbon monoxide clean-up system of the invention is easy to construct and does not include expensive components.

What is claimed is:

1. A process for purifying a gas stream containing hydrogen and carbon monoxide which process comprises the steps of introducing a controlled amount of liquid water into the gas stream so as to lower the temperature of the gas stream to a predetermined value at which preferential removal of carbon monoxide takes place in a catalyzed reaction then selectively removing carbon monoxide from the gas stream by the catalyzed reaction.

2. A process as claimed in claim 1 wherein the liquid water introduced into the gas stream is mixed with the gas stream and vaporised prior to the catalysed reaction.

3. A process as claimed in claim 2 wherein water vaporisation and mixing with the gas stream is enhanced by placing gas distribution means in the flow path of the mixture of water and the gas stream.

4. A process as claimed in claim 3 wherein the gas distribution means comprises at least one of an inert packing material, one or more static mixers and one or more baffles.

5. A process as claimed in claim 4 wherein the inert packing material comprises glass beads, ceramic pellets, or metal wool or mesh.

6. A process as claimed in any one of claims 1 to 5 wherein the catalysed removal of carbon monoxide is by selective oxidation, selective methanation or combinations thereof.

7. A process as claimed in claim 1 wherein the catalysed reaction comprises a selective oxidation reaction and air or oxygen is introduced into the gas stream prior to the catalysed reaction.

8. A process as claimed in claim 7 wherein air or oxygen is fully mixed with the gas stream prior to the catalysed reaction.

9. A process as claimed in claim 8 wherein air or oxygen is introduced into the gas stream either before or at the same point where water is introduced into the gas stream so as to be mixed simultaneously with the water and the gas stream.

10. A process as claimed in claim 8 wherein air or oxygen is added to the gas stream after introduction of water to the gas stream.

11. A process as claimed in claim 1 comprising two or more catalysed reactions for the selective removal of carbon monoxide from the gas stream.

12. A process as claimed in claim 11 wherein liquid water is introduced to only some of the catalysed reactions.

13. A process as claimed in claim 1 wherein the gas stream to be purified is a reformate gas mixture.

14. A process as claimed in claim 1 wherein the catalyst for each catalysed reaction is a supported noble metal or base metal catalyst suitable for that reaction.

15. A process as claimed in claim 1 wherein the carbon monoxide concentration in the gas stream is reduced to below 10 ppm.

16. A process as claimed in claim 1 operated in combination with a water-gas shift reaction for the reduction of carbon monoxide in the hydrogen-containing gas stream.

17. Apparatus for purifying a hydrogen-rich gas stream which contains carbon monoxide comprising a catalysed reaction zone in which carbon monoxide is selectively removed from the gas stream and means for introducing a controlled amount of liquid water into the gas stream prior to the catalysed reaction zone so as to lower the temperature of the gas stream to a predetermined value at which the preferential removal of carbon monoxide from the gas stream takes place in the catalyst reaction zone.

18. Apparatus as claimed in claim 17 provided with means for mixing the liquid water with the gas stream and vaporising the liquid water prior to the catalysed reaction zone.

19. Apparatus as claimed in claim 18 further provided with gas distribution means located in the flow path of the mixture of liquid water and the gas stream in order to enhance mixing of the liquid water and the gas stream and vaporisation of the liquid water.

20. Apparatus as claimed in claim 19 wherein the gas distribution means comprises at least one of an inert packing material, one or more static mixers and one or more baffles.

21. Apparatus as claimed in claim 20 wherein the inert packing material comprises glass beads, ceramic pellets or metal or wool mesh.

22. Apparatus as claimed in any one of claims 17 to 21 wherein the catalysed reaction zone contains a catalyst for the selective oxidation of carbon monoxide.

23. Apparatus as claimed in claim 22 provided with means for introducing air or oxygen into the gas stream prior to the catalysed reaction zone.

24. Apparatus as claimed in claim 23 wherein air or oxygen is fully mixed with gas stream prior to the catalysed reaction zone.

25. Apparatus as claimed in claim 24 wherein air or oxygen is introduced into the gas stream either before or at the same point where water is introduced into the gas stream so as to be mixed simultaneously with the water and gas stream.

26. Apparatus as claimed in claim 23 wherein air or oxygen is added to the gas stream after introduction of water to the gas stream.

27. Apparatus as claimed in claim 17 wherein the catalysed reaction zone contains a catalyst for the selective methanation of carbon monoxide.

28. A multi-stage hydrogen clean-up system comprising two or more units of apparatus as claimed in claim 17 all of said units being based on selective oxidation of carbon monoxide or all of said units being based on selective methanation of carbon monoxide or said units being a combination of selective oxidation and selective methanation units.

29. An on-board fuel cell system for vehicular application comprising (a) a hydrogen production unit; (b) a hydrogen clean-up unit and (c) a fuel cell wherein the hydrogen clean-up unit comprises apparatus as claimed in claim 17.

* * * * *